United States Patent Office 3,055,809
Patented Sept. 25, 1962

3,055,809
METHOD FOR RECOVERING ETHYLENEDIAMINE FROM AN AQUEOUS ETHYLENEDIAMINE SOLUTION
Myrl Lichtenwalter, Austin, Tex., assignor to Jefferson Chemical Company, Inc., Houston, Tex., a corporation of Delaware
No Drawing. Filed Oct. 23, 1958, Ser. No. 769,093
8 Claims. (Cl. 202—39.5)

The instant invention relates to ethylenediamine and, in particular, to a method for separating ethylenediamine from an aqueous mixture containing same.

In the manufacture of piperazine from monoethanolamine or ethylene glycol, there is produced substantial quantities of ethylenediamine which may be separated from the reaction products of the piperazine process in an aqueous admixture. Further separation of the ethylenediamine from the mixture of ethylenediamine and water is a difficult problem, however, due to the fact that ethylenediamine and water azeotrope together at about 118.5° C. A method has now been discovered whereby the formerly difficult separation of ethylenediamine and water may be effectively accomplished with a high recovery of ethylenediamine.

In accordance with this invention, an aqueous ethylenediamine mixture is subjected to distillation in the presence of a high-boiling extraction solvent or agent for ethylenediamine. As between the water and ethylenediamine, the latter is preferentially dissolved by the extraction solvent with the result that water is distilled off overhead. The bottoms mixture consisting of ethylenediamine and extraction solvent is resolved in a second simple distillation with the recovery of ethylenediamine overhead.

A number of high-boiling extraction solvents are effective for extracting ethylenediamine from a mixture of ethylenediamine and water under the conditions disclosed here. Suitable extraction solvents, which generally boil at a temperature above about 120° C., are the polyhydric alcohols including the glycols, such as ethylene glycol, propylene glycol and butylene glycol; glycol ethers, such as diethylene glycol and dipropylene glycol; and the glycerols, such as glycerin. Other effective solvents are the hydroxyamines or alkanolamines, such as monoethanolamine, diethanolamine, triethanolamine and propanolamine.

In the practice of this invention, a mixture of ethylenediamine and water is fed into a suitable fractionating column under conditions effective to vaporize the ethylenediamine and water azeotrope in the column. The extraction solvent is introduced into the column at an intermediate point preferably at or near the top thereof and is permitted to flow downwardly through the column in contact with the ethylenediamine-water vapors. The ethylenediamine is preferentially dissolved in the solvent and is carried down to the still bottoms while the water is taken off overhead. This process is continued until all of the water has been removed from the column. Thereafter, the bottoms mixtures of ethylenediamine and extraction solvent is distilled under ordinary conditions with recovery of the ethylenediamine overhead in relatively pure form.

When the instant process is operated in a continuous manner, the mixture of ethylenediamine and water is continuously fed to a first distillation column at an intermediate point thereof. The extraction solvent is also fed to the distillation column at a point near the top thereof and permitted to flow downwardly in countercurrent to the azeotroping mixture of ethylenediamine and water. The extraction solvent extracts the ethylenediamine and the water is distilled off overhead. Meanwhile, the mixture of extraction solvent and ethylenediamine accumulating as bottoms in the distillation tower is continuously passed into a second distillation tower at an intermediate point thereof to effect separation of the extraction solvent and ethylenediamine. The ethylenediamine is distilled overhead, and some of this product may be returned to the column as a reflux. The extraction solvent accumulating as bottoms in this distillation zone may be withdrawn and all or a part of same may be recycled to the first distillation tower as the extraction solvent feed.

The following examples illustrate the practice of this invention:

*Example I*

Into a 54 plate column monoethanolamine was fed at the 12th plate from the top at the rate of 5.04 gram mols per hour. At the same time 1,530 mols of water and 0.716 mol of ethylenediamine per hour were fed into the column at the 24th plate from the top. The product overhead from the column consisted of 1.392 mols/hour of water and 0.0065 mol/hour of ethylenediamine. The tower bottoms consisted of 5.04 mols/hour of monoethanolamine, 0.7095 mol/hour of ethylenediamine, and 0.1380 mol/hour of water.

*Example II*

In a second run conducted under similar conditions in the same equipment, the product overhead from the column consisted of 1.507 mol/hour of water and 0.047 mol/hour of ethylenediamine. The tower bottoms consisted of 5.04 mol/hour of monoethanolamine, 0.669 mol/hour of ethylenediamine and 0.023 mol/hour of water. Distillation of the bottoms from this run resulted in ethylenediamine containing only 1% by weight of water.

Obviously, many modifications and variations of the invention as hereinbefore set forth may be made without departing from the spirit and scope thereof, and therefore, only such limitations should be imposed as are indicated in the appended claims.

I claim:

1. A method for separating ethylenediamine from a mixture of ethylenediamine and water which comprises heating a mixture of ethylenediamine and water in a distillation zone to form a gaseous admixture or vapors of said ethylenediamine and water in said zone, introducing an extraction solvent into said zone into contact with said vapors effective to selectively dissolve ethylenediamine from said vapors of ethylenediamine and water said extraction solvent being selected from the group consisting of polyhydric alcohols, glycol ethers and alkanol amines boiling above about 120° C., distilling water overhead and recovering a substantially water-free ethylenediamine-solvent mixture as the bottoms from said distillation.

2. A method according to claim 1 in which said ethylenediamine-solvent mixture is subjected to distillation and ethylenediamine is recovered overhead.

3. A method according to claim 1 in which said extraction solvent boils in the range of 120–300° C.

4. A continuous method for separating ethylenediamine from a mixture of ethylenediamine and water which comprises continuously introducing a feed mixture of ethylenediamine and water into a distillation tower at an intermediate point thereof, continuously introducing an extraction solvent, selected from the group consisting of ethylene glycol, propylene glycol, butylene glycol, diethylene glycol, dipropylene glycol, glycerin, monoethanolamine, diethanolamine, triethanolamine and propanolamine, into said tower at a point above the ethylenediamine and water feed and into countercurrent contact with said mixture, distilling off water overhead, forming a bottoms mixture of ethylenediamine and extraction solvent, continuously withdrawing said bottoms mixture and introducing said bottoms mixture into a second distillation tower, distilling off product ethylenediamine from said second distillation tower leaving said extraction solvent as bottoms in said second tower and withdrawing at least a portion of said bottoms extraction solvent in said second tower as a recycle extraction solvent feed for said first distillation tower.

5. A process according to claim 4 in which said extraction solvent is ethylene glycol.

6. A method for separating ethylenediamine from a mixture of ethylenediamine and water which comprises heating a mixture of ethylenediamine and water in a distillation zone to form a gaseous admixture of said ethylenediamine and water in said zone, introducing monoethanolamine into said zone in contact with said ethylenediamine and water, distilling water overhead and recovering a substantially water-free mixture of said ethylenediamine and monoethanolamine as the bottoms from said distillation.

7. A process according to claim 6 in which said mixture of ethylenediamine and monoethanolamine is distilled with recovery of the ethylenediamine product overhead.

8. A continuous method for separating ethylenediamine from a mixture of ethylenediamine and water which comprises continuously introducing said mixture of ethylenediamine and water into a distillation tower at an intermediate point thereof, continuously introducing monoethanolamine into said tower at a point above the ethylenediamine and water feed and into concurrent contact with said mixture, distilling off water overhead, forming a bottoms mixture of ethylenediamine and monoethanolamine, continuously withdrawing said bottoms mixture and introducing said bottoms mixture into a second distillation tower, distilling off the product ethylenediamine from said second distillation tower, leaving said monoethanolamine as a bottoms in said second tower and withdrawing at least a portion of said bottoms monoethanolamine in said second tower as a recycle extraction solvent feed for said first distillation tower.

References Cited in the file of this patent

UNITED STATES PATENTS

| | | |
|---|---|---|
| 2,212,107 | Yabroff | Aug. 20, 1940 |
| 2,339,576 | Luten | Jan. 18, 1944 |
| 2,900,309 | Valentine | Aug. 18, 1959 |

FOREIGN PATENTS

| | | |
|---|---|---|
| 540,277 | Canada | Apr. 30, 1957 |
| 540,279 | Canada | Apr. 30, 1957 |
| 553,793 | Canada | Mar. 4, 1958 |

OTHER REFERENCES

Weissberger: "Distillation," 1951 (pp. 320–341).